Patented Nov. 8, 1949

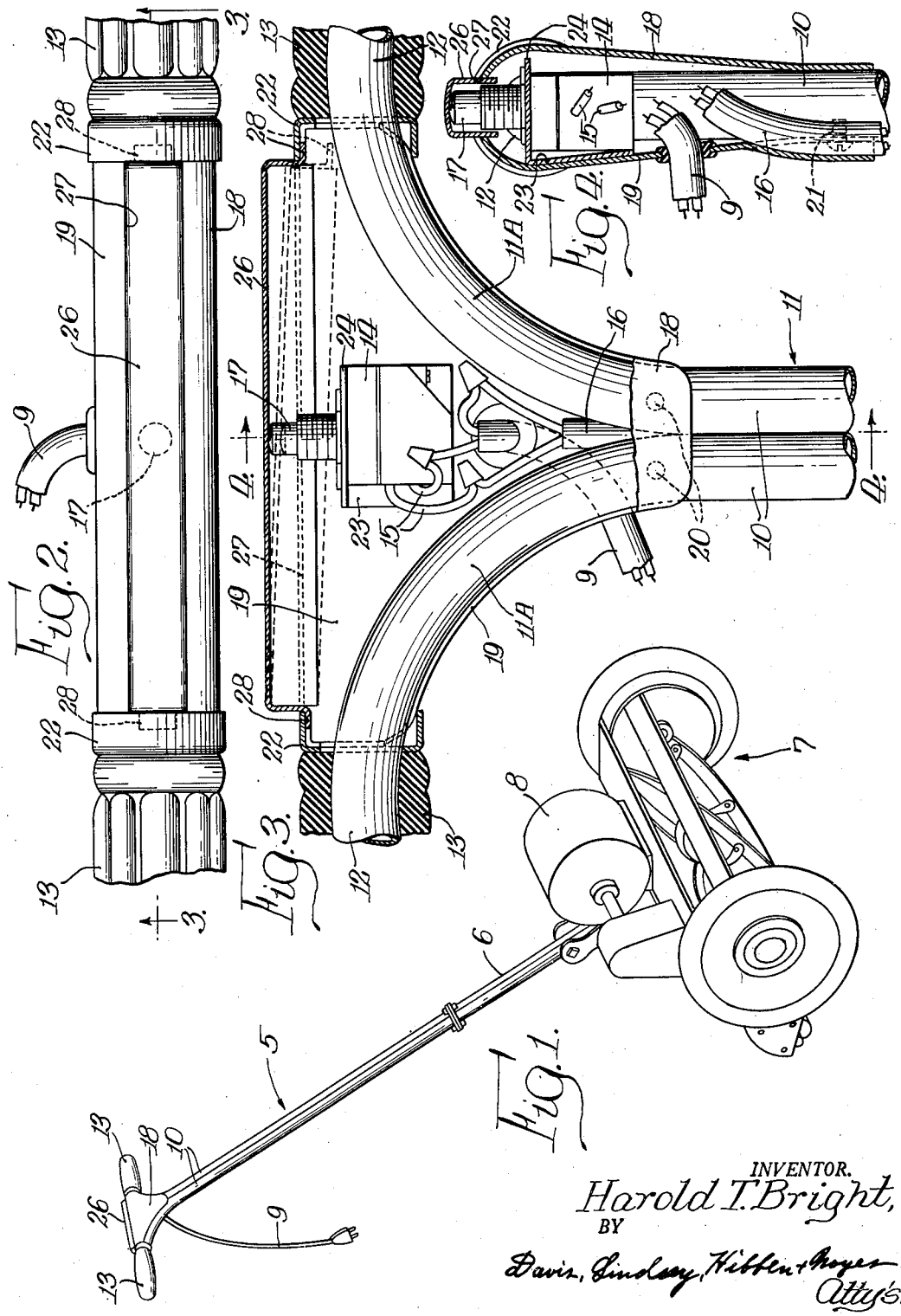

2,487,093

UNITED STATES PATENT OFFICE 2,487,093

SWITCH ACTUATOR FOR POWER-OPERATED TOOLS

Harold T. Bright, Elmhurst, Ill., assignor to King Pneumatic Tool Company, Chicago, Ill., a corporation of Illinois Application January 26, 1948, Serial No. 4,235

12 Claims. (Cl. 200—157)

This invention relates to an improved switch actuator for a power operated tool or machine of the type adapted to be moved over a surface and guided by the operator, such as a power lawn mower, and more particularly to a novel arrangement of an electric control switch with the handle of the tool.

In a tool of this character and particularly in an electric power lawn mower, it is important that the electric control switch be mounted in a readily accessible location on the mower to permit convenient operation. Furthermore, it is highly desirable that the user of the lawn mower be able to operate the control switch without the necessity of removing either hand from the handle of the mower. By means of such a control switch arrangement, it will be evident that the operation of the switch will not interrupt or otherwise interfere with the mowing process since the user can devote full attention to guiding the travel of the mower and yet be able to start or stop the electric motor at will and with maximum convenience. Maintenance and repair of the machine are greatly facilitated if the various parts of the handle structure are assembled in readily detachable relationship to permit easy access to the control switch proper.

Although my invention is described herein with particular reference to a power lawn mower, it will be apparent that the invention is adapted for use with any type of power operated tool or machine which is driven over a surface by an electric motor and which is guided by means of a handle with the operator walking behind or beside the device. For example, the invention may be used in conjunction with an electric lawn sweeper, lawn rake, floor sander, floor waxer, etc.

A primary object of the present invention is to provide a convenient and easily operable electric control switch arrangement for a power operated tool of the foregoing character.

A further object of the invention is to provide, in a power operated tool of the foregoing character, an electric control switch arrangement which the user can operate with either hand without removing the hands from the handle of the machine.

An additional object of the invention is to provide an electric control switch assembly in the handle of a power lawn mower or other similar power operated tool which comprises relatively few parts, is inexpensive to manufacture, and is easily and cheaply assembled.

Another object of the invention is to provide an electric control switch assembly on the handle of a power operated tool, such as a power lawn mower, which may be readily assembled in the first instance and which may be readily dismantled and reassembled for easy replacement or repair of the control switch proper and the connecting wiring.

Further objects of the invention will become evident from the drawing and the accompanying description thereof, in which:

Fig. 1 is a perspective view of an electric power lawn mower provided with a handle and control switch assembly embodying the principles of the present invention;

Fig. 2 is an enlarged fragmentary and elevational view of the handle structure, shown in Fig. 1;

Fig. 3 is a sectional view taken substantially along the line 3—3 of Fig. 2; and Fig. 4 is a sectional view taken along the line 4—4 of Fig. 3.

Briefly, my invention relates to a switch actuator in the form of a handle of the type comprising a shank having branching handle members at its end. An electric control switch is located at the juncture of the shank with the branching handle members, and a depressible switch-actuating bar is detachably mounted in operating engagement with the operating button of the switch by means of ferrule rings slidably disposed on said handle members in fulcruming engagement with the ends of the actuating bar. Frictionally held handle grips on the handle members retain the ferrules in place. A housing for the switch is also provided by means of a pair of complementary cover plates disposed on each side of the handle at the above mentioned juncture and secured to the shank and the branching handle members.

Fig. 1 illustrates a power lawn mower, shown merely by way of example, in which a handle assembly 5 is detachably secured to a connecting extension 6 which is pivotally mounted on a cutting unit 7 having an electric motor 8 operatively connected therewith. An electric cord 9 leads from a control switch disposed in the handle 5, as hereinafter described, and may be connected to a suitable long extension cord when the mower is in use.

In the embodiment of the invention illustrated in the drawing, the handle is formed from a pair of rod-like members 10 having a round cross-section, preferably of tubular contruction, which are welded or otherwise secured together along a substantial portion of their length to form a shank 11 from the upper end of which the rod-like members branch or curve outwardly as at 11A to provide laterally projecting handle members 12. The latter are fitted with handle grips 13 made of rubber or other suitable material frictionally telescoped over the handle members 12 and adapted to be grasped in the hands of the user of the lawn mower. An electric control switch 14 is mounted, by means hereinafter described in greater detail, in the generally triangular space formed by the curved portion 11A of the handle. The switch 14 is connected by means of wires 15 with the electric cord 9 and a cord 16 leading to the motor 8 and is provided with a projecting reciprocable or depressible operating member or button 17. A pair of complementary front and back cover plates 18 and 19, respectively, are disposed on opposite sides of such generally triangular space to provide a housing for the switch 14. The cover plates 18 and 19 are also generally triangular in shape to conform to the curved portions 11A and thus have relatively narrow bottom portions extending onto the shank 11 and adapted to be secured thereto. The wider upper portions of the plates 18 and 19 extend outwardly in opposite directions onto the handle members 12 and are adapted to be secured thereto.

Although in the embodiment of my invention depicted in the drawing the handle members 12 and the shank 11 are formed from integral, continuous, rod-like members having a switch-mounting space defined at the juncture therebetween, it should be understood that the invention in its boarder aspects is not limited to this specific handle structure.

It is an important feature of my invention that the switch housing be readily disassembled for easy access to the control switch 14. Accordingly, it is preferred that at least one of the cover plates 18 or 19 be detachably secured to the handle. As shown more clearly in Fig. 3, the form of the device illustrated in the drawing is provided with a permanently secured front plate 18 which is welded at its lower portion, as shown at 20, to the shank 11. The rear cover plate 19 is detachably secured at its lower portion to the shank 11 by means of a pair of screws 21. Both the cover plates 18 and 19 are secured to the laterally extending handle members 12 by means of ferrules or ferrule rings 22 which are slidably disposed on the handle members 12 and which detachably embrace or engage the cover plates 18 and 19 at the upper outer portions of the latter. The inner ends of the handle grips 13 are disposed in abutting relationship with the outer faces of the ferrules 22 so that the frictional engagement of the grips 15 with the handle members 12 holds the ferrules in position. Thus, it will be seen that in the form of the invention shown by way of illustration in the drawing, the front cover plate 18 is permanently affixed to the handle, whereas the rear cover plate 19 is detachably secured to the handle by means of the screws 21 and the ferrules 22. It is obviously within the scope of the invention to detachably secure both the front and back cover plates to the handle.

As best seen in Fig. 4, the electric control swtich 14 is preferably carried by the removable cover plate 19 and may be supported by an L-shaped bracket having an upright arm 23 secured flatwise to the inner face of the cover plate 19 as by welding and a projecting arm 24 to which the switch is secured. The switch 14, being thus mounted on the detachable member 19 of the complementary cover plates, is easily removed for examination, repair, or replacement.

The actuating means for the switch 14 is of a character which may be operated by either hand and in the present instance comprises an elongated, inverted, channel-shaped actuating or operating bar 26 which is depressibly disposed adjacent the switch 14 in a longitudinal opening 27 formed at the end of the handle by the upwardly extending edges of the cover plates 18 and 19. The depressible bar 26 engages, intermediate its ends and preferably at its center, the projecting switch-operating button 17. Projecting lips or pivot members 28 extend longitudinally from the opposite ends of the bar 26 and project under the ferrule rings 22 which thereby detachably retain the bar 26 in position.

The bar 26 is adapted to be operated by depression thereof at any point on its exposed surface. For example, in the view shown in Fig. 3, the bar 26, which is shown in normal undepressed condition in solid lines, may be depressed at its right end to the position shown in dotted lines. The lip 28 at the left end of the bar 26, being secured by the left-hand ferrule 22, thus functions as a fulcrum or pivot so that the central portion of the bar 26 moves downwardly to depress the actuating button 17 of the switch 14. Similarly, the bar 26 can be depressed adjacent its left end in which case the lip 28 and the ferrule 22 in engagement therewith at the right end of the bar 26 function to fulcrum the bar at its right end. Inasmuch as the actuating bar 26 may be operated to depress the switch button 17 from either end of the bar, it will be apparent that the user of the lawn mower can operate the switch by means of either thumb without removing either hand from the handle grips 13.

The handle and switch assembly described herein may be easily and quickly disassembled for access to the switch and connecting wiring by sliding the two grips 13 outwardly on the handle members 12. The ferrules 22 are thereby released and in turn the switch operating bar 26 is also released. Removal of the two screws 21 releases the cover plate 19 so that full access to the switch 14 and connecting wiring is thereby obtained.

Although only one specific form of the invention has been illustrated in the drawing, it will be understood that various modifications may be resorted to without departing from the scope of the invention as defined in the appended claims.

I claim:

1. In a power operated tool of the class described having a handle comprising a shank and handle portions branching therefrom, an electric control switch mounted adjacent the juncture of said shank and said handle portions, a switch-operating bar operatively disposed adjacent said switch, and detachable ferrules slidable onto said handle portions into overlapping engagement with the ends of said bar for retaining the latter in place.

2. In a power operated tool of the class described having a handle comprising a shank and handle portions branching therefrom, an electric control switch mounted adjacent the juncture of said shank and said handle portions, a switch-operating bar operatively disposed adjacent said switch, detachable ferrules slidable onto said handle portions into overlapping engagement with the ends of said bar for holding the latter in position, and handle grips mounted on said handle portions in abutment with said ferrules for retaining the latter in place on said handle portions.

3. A switch actuator for a power operated tool of the class described comprising a shank, handle members projecting from said shank, an electric control switch mounted at the juncture of said shank with said handle members, an elongated switch-operating bar disposed adjacent said switch in operative engagement intermediate its ends with said switch, detachable ferrules slidable onto said handle members into overlapping engagement with the opposite ends of said bar, and removable rubber handle grips tubular in form and slidable over said handle members in frictional engagement therewith, said grips having their inner ends bearing against said ferrules in abutting relationship therewith for detachably retaining said ferrules in bar-engaging position.

4. A switch actuator for a power operated tool of the class described comprising a shank having handle portions branching laterally therefrom, an electric control switch mounted at the juncture between said shank and said handle portions, said switch having a reciprocable operating button projecting outwardly therefrom in substantially the axial direction of said shank, an elongated depressible actuating bar disposed adjacent said switch in substantial alignment with said handle portions and in operative contact at its central portion with said button, said bar having pivoting lips extending longitudinally from its opposite ends, and detachable ferrules slidably disposed on said handle portions and embracing said lips whereby said bar is depressible at either end and fulcrumed at its opposite end for depressing said button.

5. A handle for a power operated tool of the class described comprising a shank, handle members branching from said shank at its upper end, a switch housing comprising complementary cover plates disposed on opposite sides of said handle at the juncture of said shank with said handle members, said plates being secured at their lower edges to said shank, an electric control switch mounted at said juncture and between said cover plates, and ferrules slidably disposed on said handle members and detachably engaged with the upper portions of said plates.

6. A handle for a power operated tool of the class described comprising a shank, handle members projecting from said shank, a cover plate disposed on one side of said handle at the juncture of said shank with said handle members and permanently secured at its lower portion to said shank, a removable cover plate disposed on the opposite side of said handle at said juncture and detachably secured at its lower portion to said shank, an electric control switch mounted on the inner face of said removable cover plate adjacent said juncture, and ferrules slidably mounted on said handle members and detachably embracing said cover plates at their upper portions for retaining the latter on said handle.

7. In a power operated tool of the class described having a handle with a shank and handle members branching therefrom, a control switch housing comprising a pair of complementary cover plates disposed on opposite sides of said handle at the juncture of said shank and said handle members, said plates having upper portions extending onto said handle members and lower portions extending onto said shank, one of said plates being permanently affixed at its lower portion to said shank and the other of said plates being detachably affixed at its lower portion to said shank, and ferrule rings slidably disposed on said handle members in embracing engagement with the outer edges of said upper portions of said plates to detachably retain the latter in place.

8. In a power operated tool of the class described, a switch actuator comprising an elongated shank, handle members extending laterally from said shank at one end thereof and defining a space at the juncture between said shank and said handle members, an electric control switch mounted in said space, a pair of complementary cover plates disposed on opposite sides of said space forming a housing for said switch, and ferrule rings slidable onto said handle members into detachable engagement with said plates to secure the latter in place.

9. In a power operated tool of the class described, a switch actuator comprising an elongated shank, laterally extending handle members curving outwardly from said shank at one end thereof and forming a space at the juncture between said shank and said handle members, a control switch housing comprising a pair of complementary cover plates disposed on opposite sides of said space, one of said plates being permanently secured to said shank and the other of said plates being detachably secured to said shank, an electric control switch disposed in said space and mounted on said detachably secured cover plate, and ferrule rings slidably disposed on said handle members in detachable engagement with said plates to secure the latter to said handle members.

10. In a power operated tool of the class described, a switch actuator comprising a pair of elongated rod-like members secured together lengthwise to form an extended shank, said rod-like members curving outwardly from one end of said shank to form laterally projecting handle portions and defining a generally triangular space at the juncture between said shank and said handle portions, an electric control switch mounted in said space, a housing for said switch comprising a pair of complementary generally triangular cover plates disposed on opposite sides of said space and secured at their lower portions to said shank, and ferrules slidably mounted on said handle portions in detachable engagement with said cover plates at their upper portions.

11. A handle for a power operated tool of the class described comprising a shank having branching handle members, an electric control switch mounted at the juncture of said shank with said handle members, a switch housing formed by a pair of complementary cover plates secured on opposite sides of the handle at said juncture, said housing having an elongated opening at its top, a switch-actuating bar disposed in said opening in operative engagement with said switch, and ferrules slidably mounted on said handle members in detachable engagement with said cover plates and the ends of said bar.

12. A switch actuator for a power operated tool of the class described comprising a pair of elongated rod-like members having a substantially round cross section and secured together lengthwise to form an extended shank, said members curving outwardly from one end of said shank to form laterally projecting handle portions and defining a generally triangular space at the juncture between said shank and said handle portions, an electric control switch mounted in said space and having a depressible operating button, a pair of complementary generally triangular cover plates disposed on opposite sides of said space, one of said plates being permanently attached at one of its apexes to said shank and the other of said plates being detachably secured at one of its apexes to said shank, and said plates defining at their upper edges an elongated opening, a depressible switch-actuating bar disposed in said opening in operative engagement intermediate its ends with said button, said bar having pivoting lips extending longitudinally from its ends, ferrule rings slidably disposed on said handle portions in detachable engagement with said lips and the remaining apexes of each of said plates, said bar being fulcrumed at its opposite ends by said engagement of said ferrule rings with said lips, and removable handle grips mounted on said handle portions in abutment with said rings to hold the latter in place.

HAROLD T. BRIGHT.

REFERENCES CITED

The following references are of record in the file of this patent:

UNITED STATES PATENTS

| Number | Name | Date |
|---|---|---|
| 1,683,988 | Reading | Sept. 11, 1928 |
| 1,795,164 | Crookshanks et al. | Mar. 3, 1931 |
| 2,370,907 | Lewis | Mar. 6, 1945 |